United States Patent [19]

Craig et al.

[11] Patent Number: 4,800,062
[45] Date of Patent: Jan. 24, 1989

[54] ON-SITE CONCRETE CASK STORAGE SYSTEM FOR SPENT NUCLEAR FUEL

[75] Inventors: Philip A. Craig, Federal Way; Richard T. Haelsig, Bellevue; John D. Kent, Gig Harbor; Duane S. Schmoker, Federal Way, all of Wash.

[73] Assignee: Nuclear Packaging, Inc., Federal Way, Wash.

[21] Appl. No.: 29,097

[22] Filed: Feb. 23, 1987

[51] Int. Cl.[4] .......................................... G21C 19/40
[52] U.S. Cl. .................................................. 376/272
[58] Field of Search ............................... 376/272, 261; 250/506.1, 507.1

[56] References Cited

U.S. PATENT DOCUMENTS

| 4,450,134 | 5/1984 | Soot et al. | 376/272 |
|---|---|---|---|
| 4,495,139 | 1/1985 | Janberg et al. | 376/272 |
| 4,532,428 | 7/1985 | Dyck et al. | 250/506.1 |
| 4,636,645 | 1/1987 | Kossinger | 376/272 |

FOREIGN PATENT DOCUMENTS

| 2706042 | 8/1978 | Fed. Rep. of Germany | 376/272 |
|---|---|---|---|
| 2753034 | 5/1979 | Fed. Rep. of Germany | 376/272 |
| 3107158 | 1/1983 | Fed. Rep. of Germany | 376/272 |
| 0235353 | 4/1986 | German Democratic Rep. | 376/272 |
| 1051595 | 3/1986 | Japan | 376/272 |

OTHER PUBLICATIONS

"Monitored Retrievable Storage (MRS) Facility", The Ralph M. Parsons Company of Delaware, No. 2M0785.
Fact Sheets, U.S. Dept. of Energy, Office of Civilian Radioactive Waste Management, Aug. 1985, No. OCRWM 1-7.
"Waste Containers for Decommissioning", Powers, DOE/RLO-SFM-82-6, Sept. 1982, pp. I-31, 32, II--67,68, III-39, 40a.
Nuclear Engr. Int., Henkel, 12/86, pp. 46-48.

Primary Examiner—Deborah L. Kyle
Assistant Examiner—Daniel Wasil
Attorney, Agent, or Firm—Christensen, O'Connor, Johnson & Kindness

[57] ABSTRACT

A storage system for storing spent nuclear fuel on site at a reactor complex includes a concrete storage cask adapted to receive fuel assemblies or loaded fuel canisters from the spent-fuel pool. The storage cask is sealed and maintained on site for a predetermined time period. The fuel assemblies or canisters can then be transferred from the concrete storage cask to a shipping container for shipment to a permanent disposal site, while the concrete casks can be reused or broken up so that the concrete can be used as fill or ballast. The fuel assemblies or canisters are removed from the pool and placed in the cask in a dry condition. Alternatively, the cask may be submerged in the fuel pool for loading. Preferably, the cask is sealed and backfilled with an inert gas. In one embodiment of the invention, the concrete storage cask is manufactured on site at the reactor complex.

8 Claims, 3 Drawing Sheets

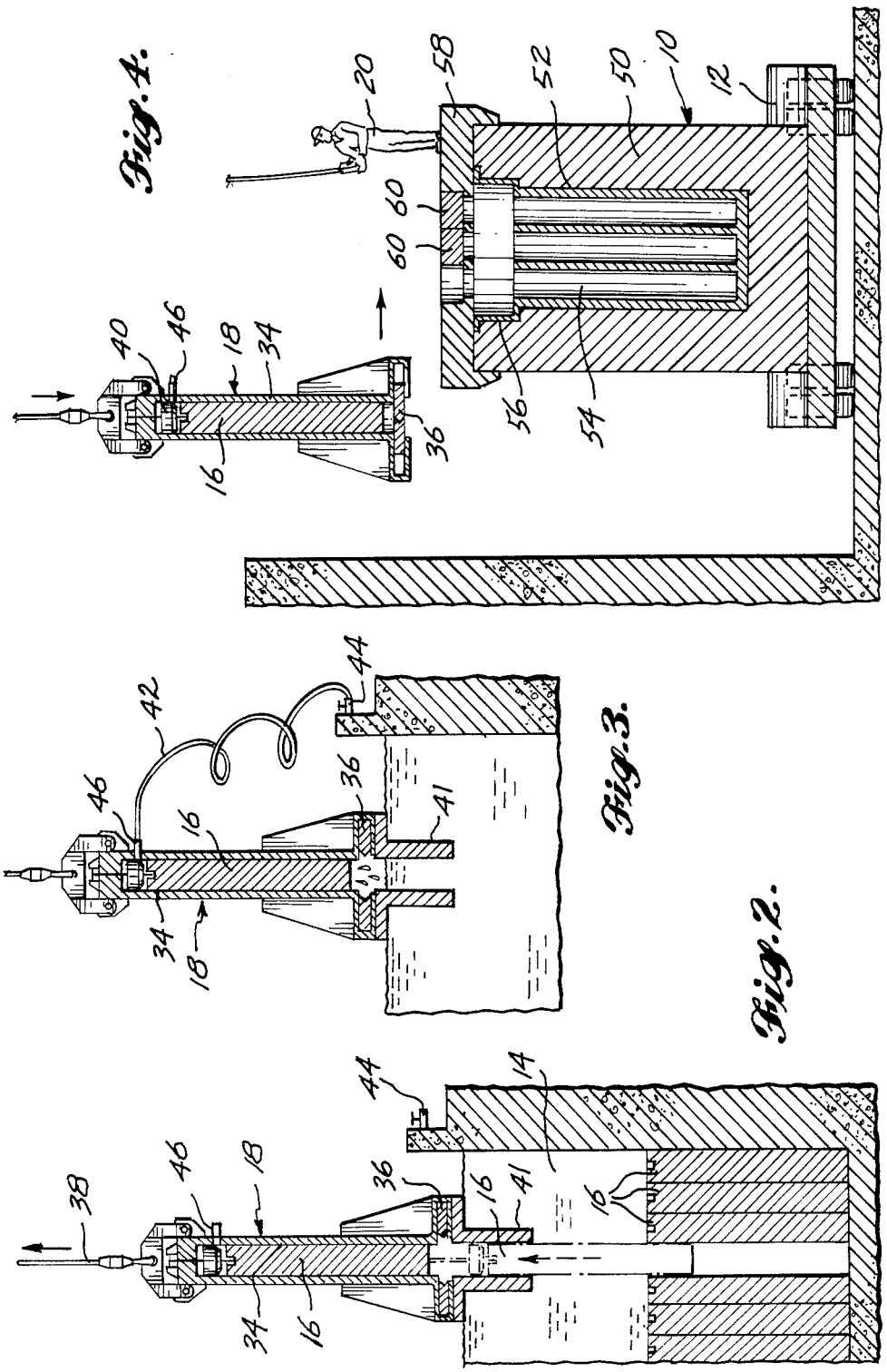

4,800,062

ON-SITE CONCRETE CASK STORAGE SYSTEM FOR SPENT NUCLEAR FUEL

BACKGROUND OF THE INVENTION

This invention relates to the storage of spent fuel from a nuclear reactor and, more particularly relates to the on-site storage of the fuel in a storage area within a concrete cask preliminary to transfer of the fuel to a shipping cask for shipping off site. The concrete cask can be manufactured at the storage site and then reused, after the fuel is shipped, or destroyed and the remaining concrete used for fill or other purposes.

One of the ongoing problems at nuclear reactors is to store the spent fuel that is taken from the reactor. In all cases, the fuel is initially placed into a spent-fuel pool where the water in the pool acts as a radiation barrier for the fuel elements at the bottom of the pool. At some point, however, the fuel must be moved from the pool to permanent disposal in a repository, since, eventually, the pool will become filled with spent fuel. In the United States, the U.S. Department of Energy is responsible, under the Nuclear Waste Policy Act of 1982, to provide for a permanent disposal repository. It will be several years between the time that the fuel is placed in the pool and the time that it is capable of being transferred for disposal, either because it has not yet lost a sufficient amount of radioactivity to be considered safe and economical for transport, or because there is no permanent disposal facility available. The U.S. Department of Energy may temporarily store spent fuel in a Monitored Retrievable Storage (MRS) facility, if it is approved by Congress, but the earliest date for receiving fuel from the reactors is ten to fifteen years away.

It is, therefore, an object of the present invention to provide an intermediate storage of the spent fuel between the pool and the disposal repository or MRS and to provide such a storage area on site at the reactor complex. It is a further object of this invention to provide a storage system in which the storage containers are reusable or can be expendable, if so desired. It is a further object of this invention to provide such a storage container that is mechanically sound and that also provides a sufficient radiation and contamination barrier for the spent fuel.

SUMMARY OF THE INVENTION

In accordance with the above-stated objects, a method for storing nuclear spent fuel is provided in which the fuel is first transferred from the spent-fuel pool to a concrete storage cask. If this transfer cannot be accomplished inside the fuel pool building, the fuel assembly must be placed into a fuel canister before it is loaded into the concrete storage cask. The concrete storage cask is then maintained in a temporary storage area at the reactor site for some predetermined period. The period of storage is determined either by the need for the fuel to lose more of its radioactivity or the availability of a permanent disposal site. Once a permanent disposal site has been provided, the fuel is transferred from the concrete storage cask to a shipping container and the shipping container, with the fuel in it, is then shipped to a permanent storage location. Alternatively, the government may accept fuel for temporary storage, such as at an MRS facility. The concrete storage cask can then be reused for a new load of fuel or can be broken up and the pieces of concrete recycled as by using it for fill or ballast or some other appropriate use.

In order to eliminate the need for transfer of the concrete cask from a point of manufacture to the reactor complex, the storage method of the present invention can include the step of manufacturing the concrete cask on site. To prevent the interior of the cask from becoming contaminated with radioactive residues, the fuel assembly or loaded canister is washed after it is removed from the fuel pool and dried prior to placement of the assembly or loaded canister into the concrete cask.

The apparatus utilized in carrying out the method includes a concrete cask having a concrete shell poured around a plurality of inner metal cells, each cell adapted to receive a fuel assembly or canister. Shield plugs are provided that fit into the cells on top of the fuel assemblies or loaded canisters to provide shielding over the top end of the fuel assemblies or loaded canisters. The apparatus also includes a means for transferring the fuel assembly or loaded canister from the pool to the cask and means for transporting the filled cask from the loading location to the storage area. Alternatively, the cask can be loaded at the storage area, in which case the transfer device is transported to the storage area. The apparatus also includes a shipping container and a means for transferring the fuel canisters from the concrete storage cask to the shipping container. A second transportation means is provided for transporting the shipping container away from the storage area. The means for transferring the fuel assembly or loaded canister from the fuel pool to the concrete cask includes a washing means for washing the fuel assembly or loaded canister after it is removed from the pool and a drying means for drying the fuel assembly or loaded canister prior to or immediately after its placement into the concrete cask.

BRIEF DESCRIPTION OF THE DRAWINGS

The workings and advantages of the present invention will be better understood by those of ordinary skill in the art and others upon reading the ensuing specification when taken in conjunction with the appended drawings:

FIG. 2 is a side elevational view in partial section of an apparatus for transferring a fuel assembly or loaded canister from the fuel pool to the cask;

FIG. 3 is a side elevational view in section of the fuel transfer apparatus having a fuel assembly or loaded canister within it.

FIG. 4 is a side elevational view in section of the fuel transfer apparatus being moved into position over the fuel storage cask;

DETAILED DESCRIPTION OF THE PREFERRED EMBODIMENT

Figure 1:
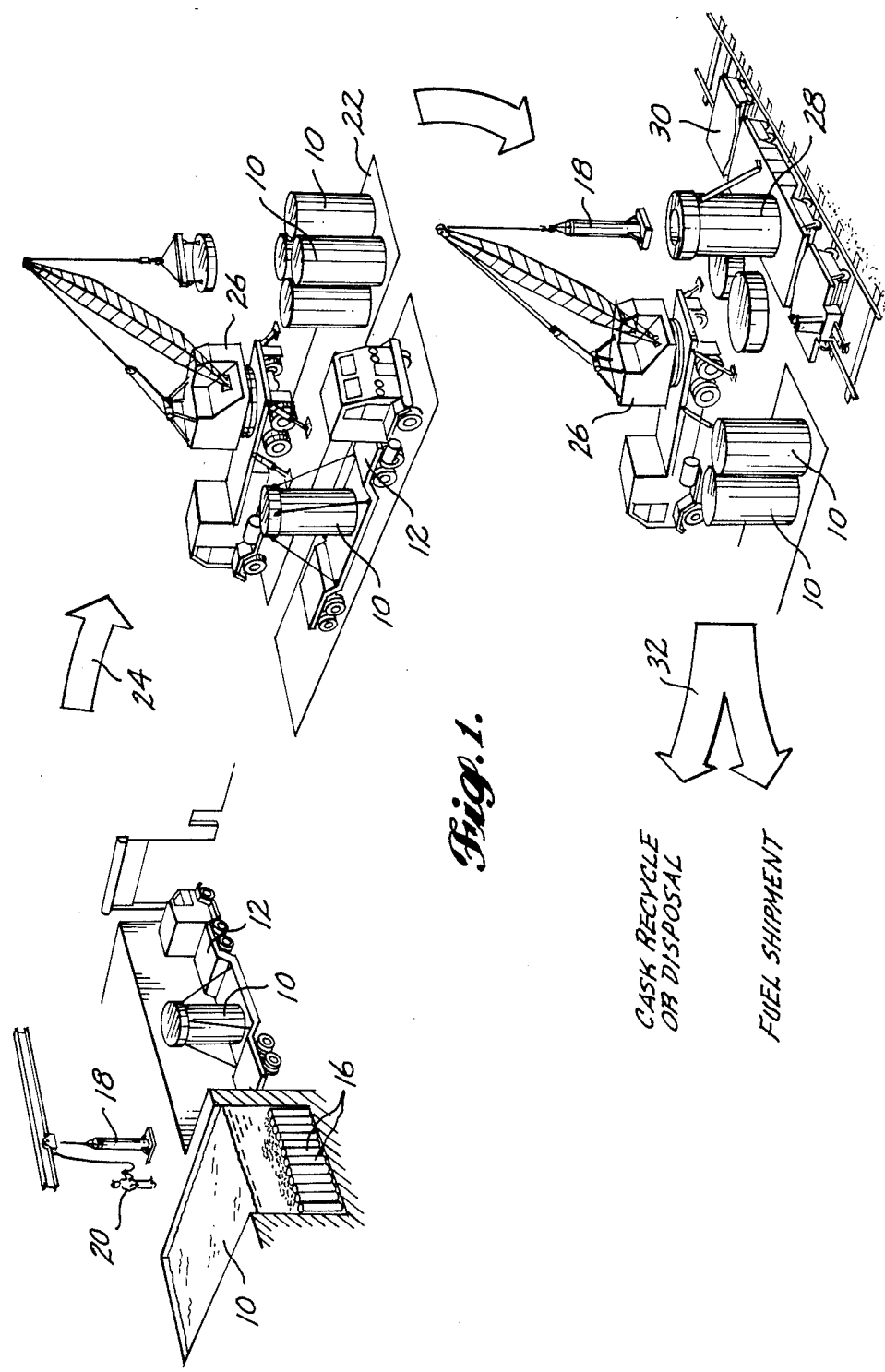
FIG. 1 is a pictorial illustration of the steps involved in the storage system according to the principles of the present invention.

FIG. 1 illustrates the typical sequence of events that occur to accomplish the on-site storage of spent nuclear fuel in accordance with the present invention. Beginning at the upper left-hand corner of FIG. 1, a concrete storage cask 10 is shown mounted in an upright position on the bed of a trailer 12 positioned in a fuel storage area adjacent a spent-fuel pool 14, which has at the bottom of the pool a plurality of fuel assemblies or canisters 16 containing spent-fuel assemblies from a reactor. A fuel transfer machine 18 is operable by the operator 20 to remove fuel assemblies or canisters 16 from the spent-fuel pool and load them into the concrete storage cask 10. After the storage cask is fully loaded, the cask is moved by the truck 12 to an on-site storage area, as shown by the arrow 24. At the storage area, a crane 26 moves the concrete cask 10 from the trailer 12 onto a pad 22 at the storage area. Alternatively, the fuel transfer machine 18 is moved from the pool room to the storage area, where the fuel is transferred to the storage cask. The concrete storage casks 10 with the spent fuel inside remain in the storage area for some period of time. The time is either determined by the decrease in the amount of radiation of the fuel or, perhaps, is the time it takes to prepare a permanent disposal site for the spent fuel. When it is time to move the fuel to a permanent disposal site, the crane 26 is used to lift the fuel transfer machine 18 to transfer the fuel assemblies or loaded canisters 16 from the concrete storage casks 10 to a shipping container 28, which is either on another truck, or, as illustrated, on a railroad car 30, for movement of the spent fuel in the shipping container 28 to its permanent disposal site. Alternatively, the concrete storage casks 10 with the spent fuel inside are returned to the pool room by the crane 26 loading the casks 10 onto a trailer 12, which is moved to the pool room for cask unloading into the shipping container 28, which is then transferred to a truck or railcar for movement of the spent fuel to its permanent disposal site. As shown by arrow 32, the fuel is transferred in the fuel shipment step to its permanent location, while the concrete casks 10 are recycled in some manner. Typically, cask recycling can mean either reuse of the same concrete storage casks to receive more spent fuel from the spent-fuel pool for on-site storage, or, alternatively, the concrete casks can be broken up and the concrete used as fill or ballast material.

Referring now to FIG. 2, the removal of a fuel assembly or loaded canister 16 from the spent-fuel pool 14 is shown in greater detail. Fuel transfer machine 18 includes a chamber 34 for receiving the fuel assembly or loaded canister 16. The chamber 34 is open at the bottom and can be closed off by a sliding door 36. In operation, the fuel transfer machine is moved on a cable 38 by the operator over the spent-fuel pool and the doors 36 opened to allow access to the chamber 34. A grapple 40 is lowered from the upper portion of the fuel transfer machine out the bottom opening of the chamber 34 and through a fixed shield tube in the fuel pool and attaches to a fuel assembly or loaded canister 16 at the bottom of the pool. The grapple is withdrawn upwardly back through the shield tube 41 into the chamber 34, bringing with it the fuel assembly or loaded canister 16 and holding the fuel assembly or loaded canister within the chamber 34. The walls of the fuel transfer machine and the shield tube act as radiation shields to any radiation that is emitted from the fuel assembly or loaded canister during this operation.

Referring now to FIG. 3, the entire fuel transfer machine 18 is held over the pool while a hose 42 is connected to a source of fresh (demineralized) water 44 and to a washing connection 46 on the fuel transfer machine to allow the clean water to rinse the fuel assembly or loaded canister, removing any residue that might be present on the fuel assembly or loaded canister. The water is allowed to drain through the open bottom of the fuel transfer machine 18, as the doors 36 are maintained in their open position. Preferably, a source of compressed air or other gas is provided at the upper end of the fuel assembly or loaded canister and blows down the interior of the chamber 34 to dry the fuel assembly or exterior of the loaded canister prior to movement of the assembly or canister away from the fuel pool.

FIG. 4 shows the fuel transfer machine, with the door 36 closed to act as a barrier to the radiation emitting from the fuel, being moved into position over the concrete storage cask 10 mounted in an upright position on the flatbed trailer 12. The concrete cask 10 includes a concrete outer shell 50 and an inner casing 52 that is divided into a plurality of storage chambers 54 for receiving the fuel assemblies or loaded canisters. The area above the casing 52 has a metal collar 56 adapted to receive shield plugs, as will be described later. A transfer adapter collar 58 is fitted over the top of the concrete cask 10 and has a plurality of openings such that one can be aligned with each of the storage chambers 54. In FIG. 4 it is shown that all of the openings in the collar can be covered by special shield doors in the collar.

Figure 7:
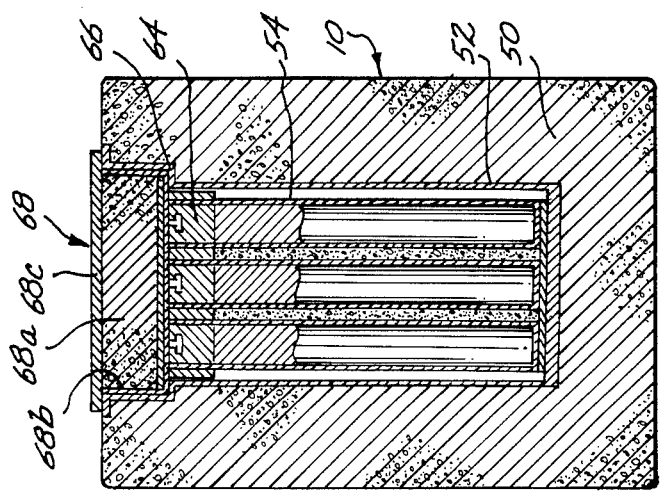
Figure 6:
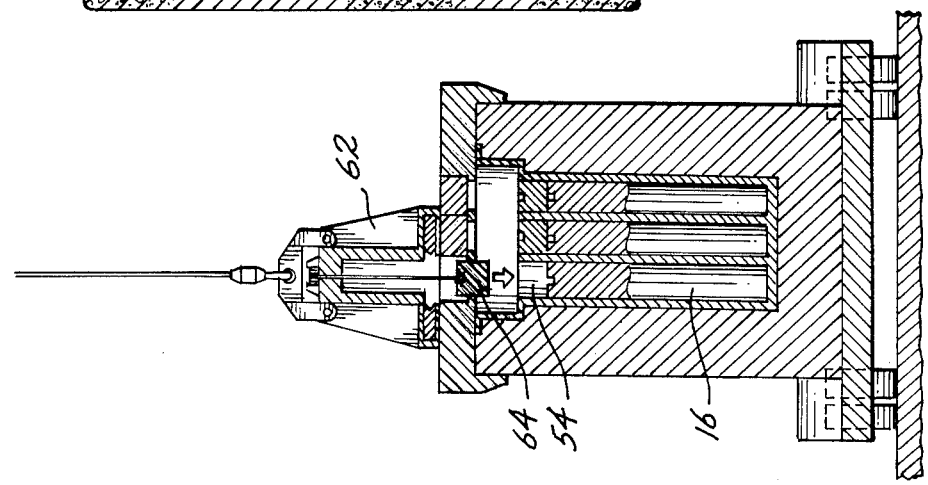
FIG. 6 is a side elevational view in section of a shield plug being installed in the fuel storage cask; and, FIG. 7 is a sectional view of a storage cask made in accordance with the principles of the present invention.
Figure 5:
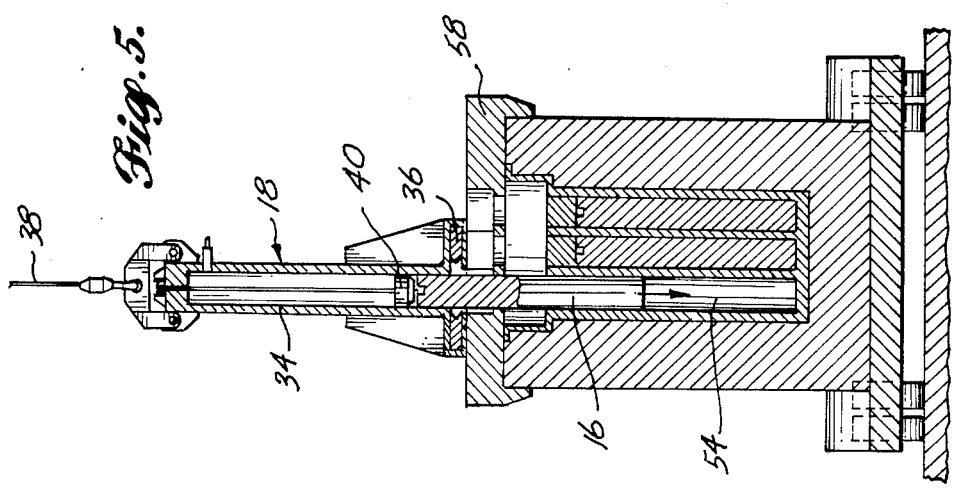
FIG. 5 is a side elevational view in section of the fuel transfer apparatus placing a fuel assembly or loaded canister into the storage cask.

Referring now to FIG. 5, the fuel transfer machine 18 is positioned over the uncovered opening in the transfer collar 58 and the grapple 40 is lowered to lower the fuel assembly or loaded canister 16 into the chamber 54. Once the assembly or canister is loaded into the chamber, the fuel transfer machine 18 is moved back to the spent-fuel pool to retrieve another canister. In the meantime, as shown in FIG. 6, a plug transfer machine 62 is positioned over the uncovered opening of the transfer collar. The plug transfer machine 62 is smaller but similar to the fuel transfer machine 18 and includes a grapple that holds a plug 64 that is lowered into position over the fuel assembly or loaded canister 16 at the upper end of the chamber 54. The plug transfer machine 62 is then removed and the next plug 60 is removed from the transfer collar to permit loading of the next chamber 54 with a fuel assembly or loaded canister that is being brought over from the spent-fuel pool. If bare fuel assemblies are placed in the chambers 54 (without canisters around them), an inner closure plate 66 may be placed over the top of the casing 52 covering all of the plugs 64, after all the chambers 54 have been filled and plugged, and welded into place to act as a shield and seal. A fuel storage cask lid 68 is positioned over the inner closure plate, if used, or over the shield plugs, and bolted and welded into place. The fuel storage cask lid 68 could include a concrete block 68a (or other neutron shield material) possibly enclosed in a casing 68b and including a metal plate 68c that is large enough to extend over the opening in the storage cask and contact the metal collar 56. The seal is accomplished by bolting and/or welding the plate to the collar 56. FIG. 7 illustrates a cross section of a loaded concrete storage cask with the cask lid in place.

Prior to final sealing, all void spaces are evacuated and backfilled with an inert gas, such as helium, argon, or nitrogen, to protect the fuel from oxygen.

The system of storage illustrated and described above provides that the interior of the storage cask will remain dry and permits loading of the cask without submerging the cask in the fuel pool, without precluding such a submerged loading approach. The fuel transfer machine provides radiation shielding around the fuel assembly or loaded canister at all times after the fuel assembly or canister is lifted out of the pool and placed into the cask. The inner casing, which defines the canister storage chambers 54, acts as a shield between the canister and the concrete shell of the storage cask to prevent contamination of the concrete shell so that after the storage cask is unloaded the concrete can be broken up and used as fill or ballast without danger of radioactive contamination. The system of the present invention allows storage of spent fuel to occur on site without the need for building excessive numbers of fuel pools or overloading fuel pools that exist. The storage casks can be maintained for several years if need be while a permanent disposal site is being prepared by the government or other parties.

Another feature of the invention is the method of storage whereby the concrete cask itself is manufactured on site, rather than being shipped to the site. Concrete is a relatively inexpensive radiation shield; however, concrete sufficient to shield from radiation can be quite thick and, therefore, quite heavy and the shipment of concrete storage casks requires a great deal of effort. Therefore, it is contemplated that the storage cask could be constructed on site to minimize the need for transport of the massive cask. In the typical scenario, a contractor would provide the internal casing components and forms necessary to pour the concrete and would hire local equipment and personnel to actually pour the concrete to manufacture the casks. The storage contractor could then bring in the necessary people to do the fuel loading of the casks after they had been constructed.

While a preferred embodiment of the invention has been described and illustrated, it will be apparent to those of ordinary skill in the art that changes can be made to the illustrated and described embodiment, while remaining within the spirit and scope of the present invention. For example, while canisters and chambers of square cross section are illustrated, other canister shapes can be accommodated with a corresponding change in the design of the concrete cask. Also, while an operator was shown in close proximity to the operations occurring in the illustrated embodiments, it will be understood that it would also be possible to conduct the loading operation remotely, through robotic techniques, including robotic welding, to minimize the risk of human exposure to radiation. If it appears that criticality of the fuel assemblies will be a problem, the internal casing of the cask can be constructed to contain neutron poison to prevent criticality.

Since changes can be made to the illustrated and described embodiment, while remaining within the spirit and scope of the present invention, the invention should be defined soley with reference to the appended claims.

The embodiments of the invention in which an exclusive property or privilege is claimed are defined as follows:

1. A method of storing spent nuclear fuel assemblies including the steps of:
   transferring the fuel assemblies from a spent-fuel pool to a moveable concrete storage cask located outside the spent-fuel pool;
   maintaining a barrier between the fuel and the concrete in the cask to prevent contamination of the concrete by the fuel;
   maintaining the concrete storage cask containing the spent fuel on site at the reactor complex for some predetermined period;
   transferring the fuel assemblies from the concrete storage cask to a shipping container; and,
   recycling the concrete storage cask.

2. The method of claim 1, wherein the recycling step includes reuse of the existing, unbroken concrete cask for another load of spent fuel.

3. The method of claim 1, wherein the recycling step includes the step of breaking up the concrete cask and using the broken concrete for other purposes.

4. The method of claim 1, further including the step of:
   fabricating the concrete cask on site at the storage facility.

5. The method of claim 1, wherein the step of transferring the fuel assemblies from the spent-fuel pool to the concrete cask includes the steps of:
   removing the fuel assembly from the spent-fuel pool;
   washing the fuel assembly with clean water; and,
   drying the fuel assembly prior to placement of the fuel assembly into the concrete cask.

6. The method of claim 5, wherein the drying step is accomplished by blowing a gas on the fuel assembly.

7. The method of claim 1, further including the steps of sealing the concrete cask and back filling the cask with an inert gas.

8. The method of claim 1, further including:
   the step of placing the fuel assembly into a canister prior to loading the concrete cask.

* * * * *